(12) United States Patent
Bastawala et al.

(10) Patent No.: US 11,314,720 B2
(45) Date of Patent: Apr. 26, 2022

(54) GLOBAL CONSISTENCY WITH RECENCY IN DISTRIBUTED DATABASE MANAGEMENT SYSTEMS

(71) Applicant: Oracle International Corporation, Redwood Shores, CA (US)

(72) Inventors: Mehul Bastawala, Sunnyvale, CA (US); Vivekanandhan Raja, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 75 days.

(21) Appl. No.: 15/908,782

(22) Filed: Feb. 28, 2018

(65) Prior Publication Data

US 2018/0253463 A1   Sep. 6, 2018

Related U.S. Application Data

(60) Provisional application No. 62/465,692, filed on Mar. 1, 2017.

(51) Int. Cl.
*G06F 16/23* (2019.01)
*G06N 20/00* (2019.01)
(Continued)

(52) U.S. Cl.
CPC .......... *G06F 16/2365* (2019.01); *G06F 15/76* (2013.01); *G06F 16/23* (2019.01);
(Continued)

(58) Field of Classification Search
None
See application file for complete search history.

(56) References Cited

U.S. PATENT DOCUMENTS 6,748,381 B1 * 6/2004 Chao ................ G06F 11/182
7,827,144 B1 * 11/2010 Saito ................ G06F 11/00
                                                707/638

(Continued)

*Primary Examiner* — Alford W Kindred
*Assistant Examiner* — Cao D Vuong
(74) *Attorney, Agent, or Firm* — Hickman Becker Bingham Ledesma LLP

(57) ABSTRACT

Techniques are described that are performed by one or more database management system (DBMS) of the plurality of DBMS nodes comprising one or more database servers performing database operations on one or more databases of the DBMS nodes. The techniques describe receiving, at a QC node, a distributed query that specifying a database of a target DBMS node. Without requesting from the target DBMS node a current logical timestamp of the DBMS node, calculating a synchronization timestamp for the distributed query. In one embodiment, the calculation of the synchronization timestamp for the distributed query is based on a current logical timestamp of the QC node and one or more previous logical timestamps of the target DBMS node that were received prior to the receiving the distributed query. The QC node sends a request to the target DBMS node to execute an operation of the query at the target DBMS node based on the synchronization timestamp. The QC node may receive result set(s) from all the target DBMS nodes based on the synchronization timestamp, and aggregate the final result set to return to the client application.

26 Claims, 5 Drawing Sheets

(51) Int. Cl.
*G06F 16/27* (2019.01)
*G06F 16/2458* (2019.01)
*G06F 15/76* (2006.01)

(52) U.S. Cl.
CPC ...... *G06F 16/2322* (2019.01); *G06F 16/2471* (2019.01); *G06F 16/2477* (2019.01); *G06F 16/27* (2019.01); *G06N 20/00* (2019.01)

(56) References Cited

U.S. PATENT DOCUMENTS

| | | | | |
|---|---|---|---|---|
| 8,099,286 | B1* | 1/2012 | Thommana | G10L 19/18 704/258 |
| 10,572,510 | B2* | 2/2020 | Lee | G06F 16/951 |
| 2012/0136956 | A1* | 5/2012 | Khoury | H04J 3/0667 709/208 |
| 2014/0006458 | A1* | 1/2014 | Hsieh | G06F 16/211 707/803 |
| 2014/0213193 | A1* | 7/2014 | Zhang | G01S 5/06 455/67.11 |

* cited by examiner

GLOBAL CONSISTENCY WITH RECENCY IN DISTRIBUTED DATABASE MANAGEMENT SYSTEMS

BENEFIT CLAIM

This application claims the benefit under 35 U.S.C. § 119(e) of provisional application 62/465,692, filed Mar. 1, 2017, the entire contents of which is hereby incorporated by reference for all purposes as if fully set forth herein.

FIELD OF THE INVENTION

The techniques and approaches described herein, relate to the field of electronic database management, particularly to ensuring global consistency with recency for distributed database management systems.

BRIEF DESCRIPTION OF THE DRAWINGS

In the drawings of certain embodiments in which like reference numerals refer to corresponding parts throughout the figures.

BACKGROUND

Figure 1:
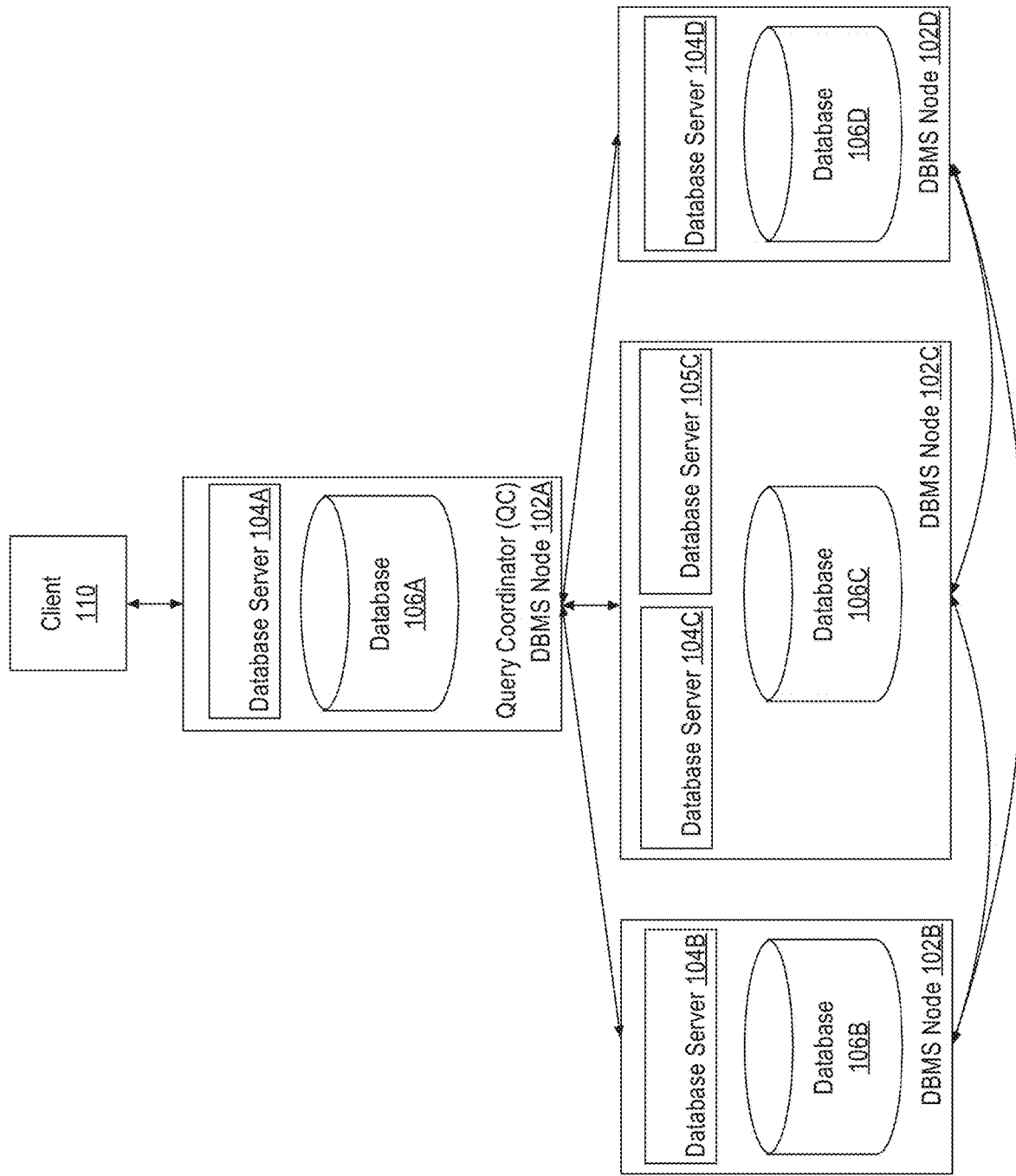
FIG. 1 is a system diagram that illustrates distributed query processing by DBMS nodes, in an embodiment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transactional consistency provides that results for a read query reflect either every effect of a transaction or none. If a process for committing a transaction encounters an error, then as a result of such an error, a subsequent read query may only return partial results of the transaction. Many techniques prevent partial commit problems on a single database management system (DBMS), however a transaction may affect multiple DBMSs. For example, multiple DBMSs may describe similar information—an airport DBMS may describe whether planes are at the gates and an airline DBMS may describe whether planes have landed in the airport or are still in the air. In such an example, if flight "F" is recorded in the DBMS of the airport as being at the gate, then the airline DBMS for flight "F" should be transactionally consistent and return that flight "F" has landed rather than returning that the plane is in the air.

"Global consistency" refers to consistency in result sets returned from plurality of DBMS nodes that describe the same information. Global inconsistency may occurs due to recency of the information returned from a particular DBMS node. Continuing with the above example, a local query to the airline DBMS may return for flight "F" that the airplane is at the gate, while a distributed query for flight "F" may transactionally consistently return from the airport and airline DBMSs that the airplane is not at the airport and is in the air. Although the returned data is consistent (because it is not contradictory), the information returned by the query is globally inconsistent due to being outdated (not recent).

Global inconsistency may occur, for example, when one of the DBMSs in a distributed query is a multi-node DBMS that has multiple database server nodes coupled to the same database. A particular node's cache may have been updated with the change in a transaction but the change may have not been propagated to all the nodes in the DBMS. The subsequent distributed query may then be processed using the data on the node that has not been updated, thus, generating transactionally inconsistent result.

DETAILED DESCRIPTION

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

A client issuing a distributed transaction to modify databases of multiple DBMS nodes may perform a distributed transaction to ensure consistency of the modification across the DBMS nodes. The "DBMS node" term refers to a server node of a DBMS that executes a work unit of a distributed query/transaction. Unlike server nodes in a multi-node DBMS that have access to the same database, different DBMS nodes may have access to different databases.

In an embodiment, when executing the distributed transaction in two phases (e.g. XA protocol), in the distributed transaction prepare phase, the client/transaction manager (TM) requests current times of the targeted DBMS and, in the commit phase, syncs the times of the targeted DBMS nodes to execute the commands as of a "synched time". The synced time used is typically greater than the maximum of the above "current times". Thus, the distributed transaction is committed at all the participating DBMS nodes as of the synched time, and the global consistency, as of the synched time is guaranteed.

Independent of the distributed transaction, a distributed query may be issued thereafter for the modified data. Unlike distributed transaction, the "distributed query" term refers to a read query issued to a DBMS node that requests at least part of the result set(s) to be returned from a different DBMS node. The term "query coordinator" (or QC) refers to the DBMS node, which receives a distributed query from a client computer system and coordinates the execution of operations on different DBMS node(s) to obtain result sets from respective databases and to combine the result sets from the different DBMS node(s) to return the result of the query to a client computer system.

Depending on whether the DBMS nodes have been updated and whether any other changes have modified the requested data since the distributed transaction, the distributed query may or may not return globally consistent data. For example, query Q1, that queries data from N+1 nodes $D_0$ through $D_N$, is issued from a client to DBMS node $D_0$. Thus, DBMS node $D_0$ becomes the QC node for the distributed query. While QC node $D_0$ requests the operation for the distributed query to be executed on DBMS nodes $D_1$ through $D_N$, another transaction $D_2$ may be transferring data a table of $D_2$ to a table of $D_3$ by modifying row(s) of the table of $D_2$ and the table of $D_3$ for the distributed transaction. If each of nodes $D_2$ and $D_3$ pick their most recent time, then depending on the latency between the commit commands executed on $D_2$ and $D_3$, for the same selected most recent timestamps, the modifications either will not be returned, will cause an error due to delay in the commit command on either one of the nodes, or will be returned. Because for the same most recent timestamps the participating DBMS nodes, multiple different outcomes are possible for the distributed query, the execution of distributed query Q1 yields a globally inconsistent result.

Local activity may also cause inconsistency. In another example, if the execution of a distributed query at QC node $D_0$ started at time T 100 but by the time the $D_0$'s request reaches DBMS node $D_5$, node $D_5$ may have executed local activity moving its time forward to T 130. Such an executed local activity on $D_5$ may cause a globally inconsistent result set for the distributed query. Accordingly, if the distributed result set is returned from $D_5$ as of the latest T 130, the result set of $D_5$ would be globally inconsistent with other result sets returned as of T 100 (such as those of QC node $D_0$ itself, as an example).

In an embodiment, to ensure consistency, the QC node that receives a distributed query may request other targeted DBMS nodes (as well as itself) to perform query operations as of a specified time. The time may be specified using logical time. Each DBMS may track its own logical time using its logical clock. A logical clock is a monotonically increasing number which is incremented based on operations of the DBMS. For example, any update of a record or a database object of a database managed by the DBMS increments the logical time/counter of the clock, also referred herein as "logical timestamp."

An example of a logical clock is a system change number (SCN). An SCN is incremented at every commit of a change to a database of a DBMS but may also be incremented for other operations. Operations logged at their performed SCNs provide a sequential order of the operations when ordered based on the respective SCNs. A redo log containing the commit record for a database may have each commit timestamped with an SCN of the commit rather than with a datetime timestamp. A data block's meta data header may also contain an SCN of its last modification.

SCN is one example of a logical timestamp, the exact type of a logical clock used to provide a logical timestamp for operations in a database management system is not critical to the techniques described herein. Although the techniques described herein may use SCN, any other logical timestamp can be readily substituted with no effect to the solutions described. SYNCHRONIZING LOGICAL TIME FOR A DISTRIBUTED QUERY To execute distributed query operations on DBMS nodes as of a particular SCN, the QC node obtains a respective logical time stamp of each of the DBMS nodes. If a particular SCN is selected, then the particular SCN may be very old for one DBMS node and may not exist yet (is in future) of another DBMS node. Thus, for a QC node to request execution of an operation of a distributed query as of a particular time on a DBMS node, the QC node has to be aware of the current logical time of such a DBMS node. Accordingly, the QC node has to obtain current logical timestamp of each and every node of the DBMS nodes targeted by the distributed query.

For example, if a distributed query to a QC node targets N other DBMS nodes, as in the previous example, then the QC node has to obtain the latest SCNs from the N-number of the DBMS nodes, before requesting each DBMS node to execute an operation as of a particular SCN. This results in a huge latency cost for a distributed query, especially in cases in which N is significantly large and/or the DBMS nodes are significantly geographically distant from one another, particularly from the QC node.

To ensure global consistency with recency, in an embodiment, a QC node synchronizes the logical clocks of targeted DBMS nodes to a particular logical timestamp. In such an embodiment, DBMS nodes provide an interface for their respective logical clocks to be set to a particular logical timestamp that is greater than their current time stamp.

When the QC node synchronizes the logical clocks of DBMS nodes to a particular common logical timestamp before sending the distributed query, then the result set returned from the DBMS nodes is guaranteed to be globally consistent. Once the DBMS nodes are synchronized, the operations executed for the distributed query on the target DBMS nodes are as recent as of at least the synchronized logical timestamp.

One technique for synchronization of logical timestamps of DBMS nodes is to have a synchronization phase for a distributed query in which each of the latest timestamps of DBMS nodes are queried and the maximum of all the received timestamp is selected as the synchronization timestamp. The synchronization timestamp is then incremented, and the QC node sends the incremented synchronization timestamp to be set for all the DBMS nodes.

The synchronization phase adds a significant latency to a distributed query execution. First and foremost, the QC node obtains each and every DBMS nodes' current logical timestamp. After obtaining the logical timestamps, the QC node determines the maximum and increments the maximum to increase recency. One reason for incrementing the determined maximum is to take into account the latency incurred in calculation of the maximum and/or network latency for a synchronization request reaching a remote DBMS node. During the calculation and network delays, the logical clock of a DBMS node keeps incrementing, and at the receipt of the request, the logical timestamp of the DBMS node may have progressed further than first determined by the QC node. Thus, if not sufficiently incremented, in some cases, the selected maximum may be rejected by one or more of the target DBMS nodes because that DBMS node's current logical timestamp has surpassed the incremented maximum. Such rejection would re-trigger performing the synchronization phase and thus, add further to the latency of the distributed query. As an example, the DBMS may be configured to attempt at least one or two retries to estimate a valid SCN to execute the query at remote nodes.

The term "synchronization timestamp difference" refers herein to the difference between the synchronization timestamp, that is requested to be set at a DBMS node and the current logical timestamp at the DBMS node. The term "synchronization miss" refers herein to the synchronization timestamp being less than the current logical timestamp at the DBMS node. The synchronization miss at a DBMS node may cause the DBMS node to reject the synchronization timestamp as described below.

To avoid the rejection, the QC node may increment the maximum by a significant value, however that may increase the risk of at least one DBMS node having a logical time overflow. The logical timestamp may be tracked using a fixed-number-of-bits counter, if the counter is incremented by great enough number the counter may run out of allocated number space for a logical timestamp. The clock may overflow quicker and cause the node to do additional processing to handle the overflow.

Additionally, until the synchronization phase is successfully executed, no result set can be received by a QC node. The QC node may need to request the logical timestamp for all target DBMS nodes before receiving result sets from them. Otherwise, if the QC node selected synchronization logical timestamp without the knowledge of the other logical timestamps, the result sets returned from the other nodes as of that timestamp may not be usable. Such result sets may be inconsistent with the target DBMS node that had a greater logical timestamp at the receipt of the request. Therefore, the QC node has to wait for all target DBMS nodes to report their respective logical timestamps or risk discarding results sets from one of the DBMS nodes that had a higher logical timestamp at the receipt of the request.

Overview of Synchronization Improvements for Distributed Query

To improve the latency of a distributed query execution and to provide recent result set while maintaining consistency among DBMS nodes, a QC node maintains a log of logical timestamps of other DBMS nodes, in an embodiment. The "history log" term refers herein to a log maintained by a QC node that stores information about logical timestamps of other DBMS nodes.

In an embodiment, the logical timestamps of DBMS nodes may be maintained as a deviation from the logical timestamp of the QC node at the time of the obtaining of DBMS node's logical timestamp. The "QC deviation" (or simply "deviation") of a DBMS node refers to the difference of logical timestamps between a QC node and the DBMS node as of a particular time. The QC deviation may be positive representing that the DBMS node's logical timestamp was ahead of the QC node's logical timestamp as of the particular time, and may be negative representing that the DBMS node's logical timestamp was behind of the QC node's logical time stamp as of the particular time, or vice versa. For example, the QC deviation of a DBMS node may be the difference between the SCN obtained from the DBMS node and the current SCN of the QC node (at the time of a receipt of the SCN or at the time when QC has sent the request for the DBMS node's SCN).

In one embodiment, a history log of a QC node may be periodically updated in response to receiving DBMS node logical timestamps from periodic requests from the QC node. In another embodiment, asynchronous updates to the history log may be caused by DBMS nodes piggybacking logical timestamps on messages sent to the QC node. Regardless of the type of update, the history log may maintain information about multiple logical timestamps for a single DBMS node that have been received at different times. The QC node may use one or more statistical functions to aggregate the multiple deviations of a DBMS node to yield the QC deviation of a DBMS node.

In an embodiment, in response to a receipt of a distributed query by a QC node, the QC node determines the maximum deviation based on the deviations of the target DBMS nodes stored in the history log of the QC node. Using the determined maximum deviation and the QC node's logical time stamp, the QC node determines the synchronization timestamp for the distributed query to set for all nodes targeted by the query. The QC node may adjust itself and may request each of the other target DBMS nodes to adjust their respective logical clocks to the synchronization timestamp. In an embodiment, the QC nodes can receive result sets from a target DBMS as soon as the synchronization timestamp has been successfully set at the target DBMS, and the operation of the distributed query on the target DBMS starts generating a result set. A partial result set may be received by the QC node even while the other target DBMS nodes are still executing the operations of the distributed query, thus significantly improving the latency of the distributed query execution.

System Overview

FIG. 1 is a system diagram that illustrates distributed query processing by DBMS nodes 102A-D, in an embodiment. Each of DBMS nodes 102A-D include one or more database servers that service query requests to one or more databases of the respective DBMS node. DBMS 102A-D may be located at a location remote from one another but connected through a network, such as a local area network (LAN), or a wide-area network (WAN) such as the Internet.

In an embodiment, DBMS nodes 102A-D include heterogeneous database management systems. DBMS's are heterogeneous based on differences in a DBMS architecture, software, operating system, compute and storage hardware, data storing methodology. For example, DBMS node 102C and DBMS 102B are heterogenous DBMS's. While DBMS 102B is a single node DBMS, DBMS 102C is a multi-node DBMS, in which either database server 104C or database server 105C may service queries received by DBMS node 102C for processing against database 106C.

In an embodiment, databases 106A-D store different user data in different database objects (which are not copies of each other) regardless whether the respective DBMS nodes are homogenous or heterogeneous. To retrieve user data from data tables stored in databases 106A-D, client 110 sends a request for a distributed query execution to DBMS node 102A specifying the target tables of databases 106A-D. The receipt of the distributed query by DBMS node 102A designates the DBMS node 102A as a QC node for the distributed query. To execute a distributed query, QC node 102A may issue one or more database operations to be executed by DBMS nodes 102B-D, in addition to query operations executed by its own database server 104A on database 106A. The results of the operations are returned to the QC node 102A for aggregation and generation of the final result set of the distributed query.

In an embodiment, QC node 102A maintains a history log of logical timestamps of other DBMS nodes such as DBMS nodes 102B-D. In one example, QC node 102A stores the history log in database 106A. Once new logical timestamps are received from DBMS nodes 102B-D, the QC updates the history log based on the new timestamps. Since any of DBMS nodes 102A-D may be designated as a QC node upon a receipt of a distributed query, DBMS nodes 102B-D may also maintain history log alternatively or in addition to DBMS node 102A maintaining such a history log. Thus, one or more of DBMS nodes 102A-D may maintain their own history logs with timestamps obtained from other DBMS nodes. For example, DBMS node 102B may maintain SCNs and/or QC deviations of DBMS nodes 102A, 102C and 102D independently of the SCNs and/or QC deviations maintained by QC node 102A that received a distributed query from client 110.

In an embodiment, a QC node may maintain a history log as an array of tuples, each tuple containing one or more record entries. A tuple may include entries with information on logical timestamps obtained from a DBMS node such as a QC deviation, a description of the DBMS node, an actual datetime timestamp of the receipt of the logical time stamp. The array of tuples may be arranged as a data table stored in a database of the QC node, each tuple being a row in the data table and each entry of a tuple corresponding to a column.

Functional Overview

Figure 2:
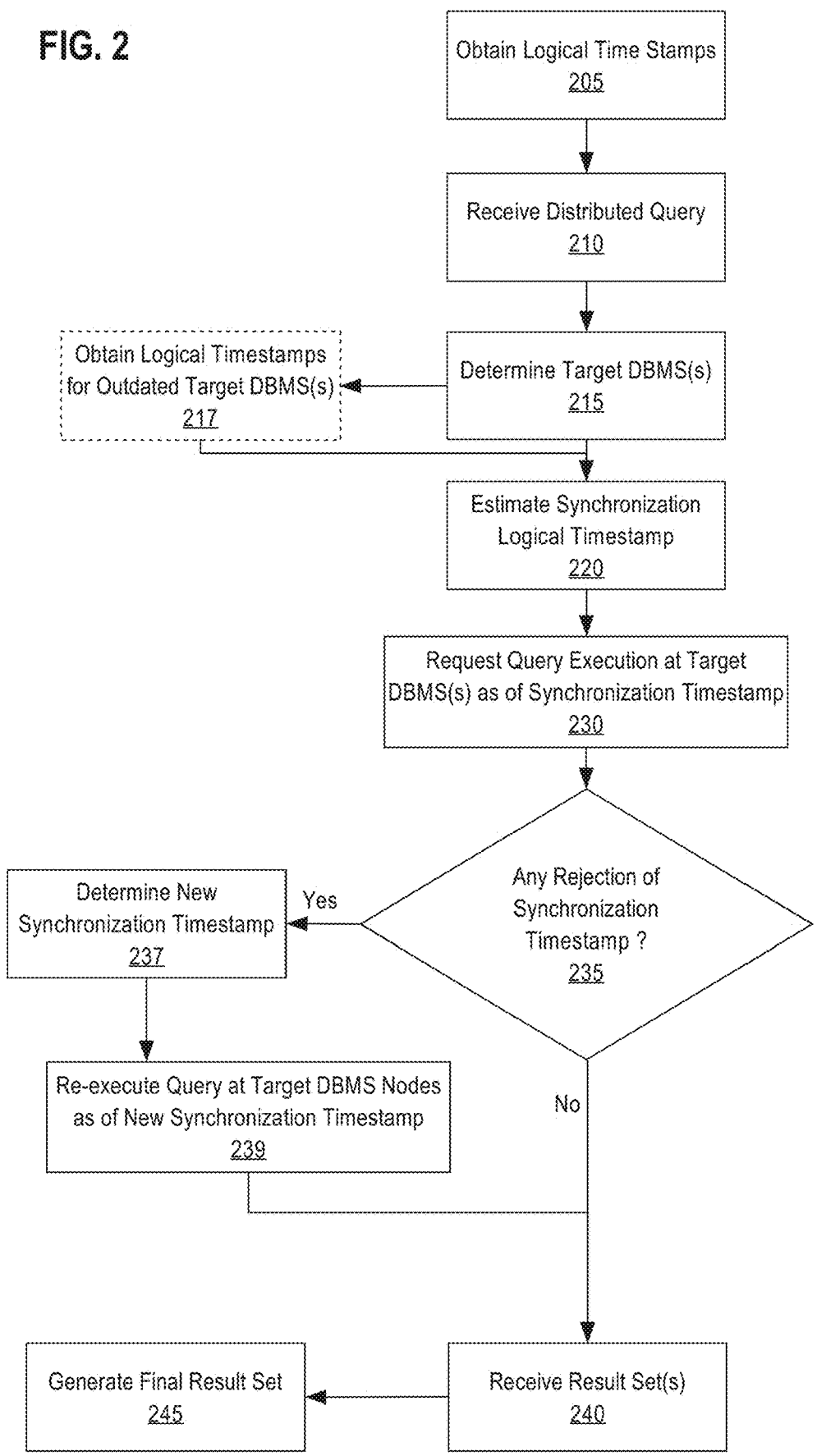
FIG. 2 is a flowchart diagram depicting a process for synchronizing target DBMS nodes to generate consistent and recent result for a distributed query, in an embodiment.

FIG. 2 is a flowchart depicting a process for synchronizing target DBMS nodes to generate a consistent and recent result for a distributed query, in an embodiment. At step 205, a DBMS node obtains logical time stamps of one or more other DBMS nodes. The DBMS node may be aware of the other DBMS nodes based on prior communication. For example, if the DBMS node has received a distributed query that included a new DBMS node that was not previously known by the DBMS node, the DBMS node may store the information about the new DBMS nodes in its history log and start updating the history log with information received from the new DBMS node.

Alternatively or additionally, the current DBMS node may actively discover other DBMS nodes using various network discovery protocols such as DNS (Domain Name Service). Once discovered a new DBMS node information is stored in the history log, and the history log is updated with information received from the new DBMS node.

In one embodiment, a DBMS node is configured to periodically communicate with other known DBMS nodes to request their respective information such as their respective logical timestamps. The frequency of communication may be configured. Alternatively, the frequency of request may depend on the logical timestamps received and QC deviations thereof at different times. For example, if the QC deviation of another DBMS node keeps increasing, the increase indicates that the changes on the other DBMS node occur at a much faster rate. Accordingly, the frequency of the request may be proportionally increased to retrieve a more accurate logical timestamp for the other DBMS node. In addition to or alternative to storing the received logical timestamps, the QC deviations thereof may be stored in the history log along with the datetime timestamps for the retrievals.

Additionally or alternatively to periodic polling for logical timestamps of other DBMS nodes, a DBMS node may asynchronously receive such logical timestamps. When a DBMS node exchanges messages with another DBMS node, the current logical timestamp of the other DBMS node may be piggybacked to the messages. Such messages may be exchanged for an execution of an operation for a distributed query or a backup/restore operation, as non-limiting examples. Based on the received logical timestamps for other DBMS nodes, the respective QC deviations may be calculated and stored in the history log of the DBMS node along with the datetime timestamp of the receipts.

At step 210, a DBMS node receives a distributed query and thus becomes a designated QC node for the received distributed query. At step 215, based on the distributed query, the QC node determines the target DBMS nodes on which operations for the query need to be executed and results retrieved. The QC node may query its history log to retrieve QC deviations of the target DBMS nodes.

In an embodiment, the QC node proceeds to estimate the synchronization logical timestamp for the distributed query at step 220 based on the retrieved information on target DBMS nodes from the history log. In an alternative embodiment, at step 217, the QC node iterates through the history log to determine whether information on logical timestamps of the target DBMS nodes is outdated based on their respective datetime timestamps. A threshold period may be configured at the QC node. If the latest QC deviation of a target DBMS node is outside the configured time period, then the QC node initiates obtaining the latest logical time stamp from the target DBMS node to calculate the QC deviation.

This further improves the execution of a received query because the QC node requests new SCNs only from those nodes that have outdated SCN data stored at the QC node. Limiting the number of requests for current SCNs shortens the synchronization phase execution of a distributed query and the latency of receiving results for the distributed query.

For example, QC node $D_0$ receives a distributed query Q1 and determines that DBMS nodes $D_1$ through $D_{10}$ are target nodes of query Q1. At the time query Q1 is received, the QC node's system clock is at 9:35 am, and QC node $D_0$ stores a history log as the following array of tuples of [Time of Last Sync, QC SCN Deviation]:
[D1]=[9:25 am, 5],
[D2]=[8:55 am, −10],
[D3]=[8:30 am, 80],
[D4]=[9:23 am, 90],
[D5]=[9:21 am, 20],
[D6]=[9:31 am, −20],
[D7]=[9:24 am, 45],
[D8]=[9:11 am, 50],
[D9]=[9:22 am, −10],
[D10]=[9:26 am, 15].

In such a sample history log, the $D_1$'s entry indicates that the last SCN from $D_1$ was sent at 9:25 am, and the $D_1$'s SCN was 5 more than the QC node's SCN at that time. Accordingly, $D_1$ is a (slightly) more "busy" DBMS node than DBMS node $D_0$, at least as of 9:25 am (greater number of database activities on DBMS node $D_1$ push the time forward at a greater pace). The $D_2$'s entry indicates the last SCN from $D_2$ was sent at 8:25 am, and the $D_2$'s SCN was 10 less than the QC node's SCN at that time. Accordingly, $D_2$ is a (slightly) less "busy" DBMS node than DBMS node $D_0$ at least as of 8:55 am.

Continuing with the example, if the configured threshold for an outdated SCN is 30 minutes, DBMS nodes whose SCNs were received prior to (9:35 am (current time)−0:30) =9:05 am require a scan to refresh the old values. Accordingly, QC node $D_0$ requests latest SCNs from DBMS nodes $D_2$ and $D_3$. With the QC node SCN being at 100, QC node may receive an SCN of 95 from DBMS node $D_2$ at 9:36 am and an SCN of 170 from at 9:37 DBMS node $D_3$. Thus, QC node updates the history log with [D2]=[9:36 am, −5] and [D3]=[9:37 am, 70].

Estimating Synchronization Logical Timestamp

Continuing with FIG. 2, at step 220, the QC node of a distributed query estimates the synchronization logical timestamp based on its history log. To make this estimate, the QC node may apply one or more statistical aggregation functions to the QC deviations for the target DBMS nodes of the distributed query in the history log. The application of such functions yields a synchronization adjustment such as a maximum QC deviation described above. The term "synchronization adjustment" refers herein to an adjustment to be made to a logical timestamp of at least one DBMS node (such as a QC node) to yield the synchronization timestamp at which a distributed query is to be executed. The synchronization adjustment may affect the logical timestamp at which the query will be executed at a remote DBMS node. For example, a calculated synchronization adjustment may be applied to the current logical timestamp of the QC node to yield the synchronization timestamp. The synchronization timestamp may be further padded by a pre-configured value to account for the communication delay in requesting the target DBMS nodes to set the logical clocks thereof to the requested synchronization timestamp.

In one example, the synchronization adjustment is calculated using the maximum function. The QC node calculates the maximum of QC deviations of target DBMS nodes and adds the maximum to the current logical timestamp of the QC node to estimate synchronization logical timestamp. In another example, the QC node calculates the median of the QC deviations and adds the median to the current logical timestamp of the QC node to estimate synchronization.

In an embodiment, the QC node excludes from the calculation of the synchronization timestamp the QC deviations of target DBMS node(s) which are negative (have slower paced changes). The exclusion ensures that the QC node does not request a reduction in a current logical timestamp of any DBMS node (including the QC node itself) as any reduction would affect causal order of events. For example, if the estimation yields a negative adjustment to the QC node's logical timestamp, then the QC node itself is going to reject the request to set to the synchronization timestamp causing the synchronization to fail for all the target DBMS node(s).

Continuing with the above example of DBMS nodes $D_0$-$D_{10}$, the target DBMS nodes D1 through D10 of query Q1 have the following tuples of datetime timestamp and QC deviation stored in the history log of QC node $D_0$:
[D1]=[9:25 am, 5],
[D2]=[9:36 am, −5],
[D3]=[9:37 am, 70],
[D4]=[9:23 am, 90],
[D5]=[9:21 am, 20],
[D6]=[9:31 am, −20],
[D7]=[9:24 am, 45],
[D8]=[9:11 am, 50],
[D9]=[9:22 am, −10],
[D10]=[9:26 am, 15].

QC node $D_0$ may skip the tuples whose SCN deviation is recorded to be negative at the time of the receipt. Hence, the QC node may skip entries for nodes $D_2$, D6, D9. The maximum of SCN deviations of the non-skipped DBMS nodes is 90 (for D4). Accordingly, the QC node assumes that the highest running node will still be 90 SCNs more than QC node itself.

QC node $D_0$ estimates the synchronization logical timestamp by adding its own current SCN of 100 to the adjustment and calculates the synchronization timestamp to be 190. The synchronization SCN of 190 may be used for all DBMS nodes (including the QC node) to get recent results without having to request each DBMS node for their current SCN.

In another example, the statistical aggregation for determining the synchronization adjustment is a median. Ordered by the QC deviations, [−20, −10, −5, 5, 15, 20, 45, 50, 70, 90], yields the SCN of 15 as the median QC deviation. The QC node may adjust its own current SCN of 100 with the median QC deviation to yield the synchronization SCN of 115. In yet another example, an average of the QC deviations may be similarly used for estimating the synchronization SCN for nodes $D_1$ through $D_{10}$, which yields an average synchronization adjustment of 26.

In other embodiments, negative QC deviation(s) may be used (QC deviations that indicate that a DBMS node has slower-paced changes and thus is behind in its logical timestamp as compared to the QC node). Thus, in such embodiments, the synchronization adjustment to the QC node's logical timestamp may indeed be calculated to be negative. If the synchronization adjustment is negative, then the current QC node logical timestamp may be used as the synchronization logical timestamp. For example, if average, median, maximum or any other function yields a non-positive QC synchronization adjustment for DBMS nodes $D_1$ through $D_{10}$, there is no adjustment, and the QC node's current SCN may be used as the synchronization logical timestamp.

As new interactions occur between the QC and other DBMS nodes, the logical timestamps of the DBMS nodes resulting from the recent interaction may update the tuples from the older interactions in the history log. Thus, the next distributed query at the QC node may use refreshed QC deviations yielding a more accurate estimate for synchronization timestamp.

In an embodiment, a QC node may maintain multiple tuples per each DBMS node in its history log. In such an embodiment, the QC node may apply one or more statistical aggregation functions on QC deviations for the tuples of a particular DBMS node to determine the aggregate QC deviation of the DBMS node, and then use the aggregate QC deviation for calculating the synchronization adjustment using the techniques described herein.

For example, continuing with QC node $D_0$ and DBMS nodes $D_1$ through $D_{10}$, the history log stored on QC node $D_0$ may include five tuples for each DBMS node as depicted in Table 1 below.

TABLE 1

QC Deviation Tuples History Log

| Node | QC Deviation Tuples (Time, SCN) | | | | |
|---|---|---|---|---|---|
| $D_1$ | (9:15, 5) | (9:18, 4) | (9:19, 9) | (9:23, 20) | (9:25, 5) |
| $D_2$ | (9:00, 0) | (9:08, −7) | (9:09, 15) | (9:13, 50) | (9:25, 15) |
| $D_3$ | (9:17, −8) | (9:18, 4) | (9:19, 49) | (9:23, 10) | (9:25, 5) |
| $D_4$ | (9:15, 10) | (9:18, 19) | (9:19, 54) | (9:23, −3) | (9:25, −3) |
| $D_5$ | (9:15, 11) | (9:18, 17) | (9:19, 32) | (9:23, 15) | (9:25:002, 12) |
| $D_6$ | (9:15, −7) | (9:18, 7) | (9:19:80, 73) | (9:23, 28) | (9:25, 34) |
| $D_7$ | (9:15, −9) | (9:18, 27) | (9:19, −4) | (9:23, 78) | (9:25, 37) |
| $D_8$ | (9:15, 30) | (9:18, 28) | (9:19, 13) | (9:23, 29) | (9:25, −1) |
| $D_9$ | (9:16, −9) | (9:18, 30) | (9:19, 14) | (9:23, 11) | (9:25, 21) |
| $D_{10}$ | (9:15, 30) | (9:18, 32) | (9:19, 11) | (9:23, 34) | (9:25, 14) |

QC node $D_0$ aggregates the tuples separately for each DBMS node, $D_1$ through $D_{10}$. As one example, QC node $D_0$ may calculate the median value for DBMS node D7 to yield an aggregate QC deviation of 27 for DBMS node D7.

In an embodiment, the QC node selects only those QC deviations that are based on the logical timestamps received within a preconfigured time. The aggregate QC deviation for a DBMS node may exclude the QC deviations that are based on older logical timestamps and/or based on an excessive deviation (beyond a configured threshold), improving the accuracy of the estimate of synchronization timestamp. If the QC node has not received any logical timestamps from a particular node, the QC node may request the current logical timestamp from the particular node for determining the QC deviation of the particular node.

For example, continuing with the sample DBMS nodes $D_0$-$D_{10}$ and Table 1 depicting a sample history log table stored at DBMS node $D_0$, median values of each node whose SCN was received within the last 30 minutes is calculated. As of the current time of 9:35 am at DBMS node $D_0$, all the entries in the history log that have older datetime timestamp of 9:35−30=9:05 am are discarded. First log entry for DBMS node $D_2$ is datetime timestamped at 9:00 am and thus the SCN of 0 for DBMS node $D_2$ is ignored in the calculation of the median. The list below depicts the calculated median values for each of DBMS nodes $D_1$-$D_{10}$.

[D1]=[5]
[D2]=[15]
[D3]=[70]
[D4]=[10]
[D5]=[15]
[D6]=[28]
[D7]=[27]
[D8]=[28]
[D9]=[14]
[D10]=[30]

From these median values, the QC node may select the maximum SCN of 70 as the synchronization adjustment for the synchronization timestamp to be more definitively larger than the "fastest" DBMS node (on median). Alternatively, the QC node may use the average SCN of 24 for computing the synchronization timestamp.

In a related embodiment, the preconfigured time period for exclusion of tuples can be configured for each node. The tuple(s) of a DBMS node that exceed the time period configured for that node, are discarded. A special time period value for a DBMS node may indicate that the QC node has to always request the latest logical timestamp for the DBMS node before proceeding to determine the synchronization timestamp. Accordingly, for such a DBMS node the synchronization phase should be performed by the QC node regardless of when the last interaction and the last logical timestamp was received for the DBMS node. For example, the time period value of zero for a DBMS node may indicate that synchronization has to always be performed.

Estimating Current Logical Timestamp of DBMS Node

In an embodiment, using entries of a history log for a DBMS node, a historical function for the QC deviation is derived. Using the derived historical function, an accurate, current QC deviation for the synchronization timestamp may be computed. Multiple historical QC deviation values for each DBMS node may be fitted to a function.

The following equation describes an example of a historical function for estimating current logical timestamps for a DBMS node:

$$y=f(x)+\text{delta}$$

where y denotes the derived logical timestamp, x denotes a datetime timestamp and delta is an adjustment value, in an embodiment. In some embodiments, the function and/or the adjustment value are specific to the DBMS node. Accordingly, using the function and the adjustment value for the DBMS node, the QC node may compute the logical timestamp of the DBMS node for a future or current datetime timestamp without sending a request to the DBMS node. Using this technique, the QC node may accurately estimate the logical timestamp of a DBMS node without performing the synchronization phase, considerably improving the performance of a distributed query.

In one embodiment, two of the historical QC deviations and their respective datetime timestamps may be used in a linear regression to compute a QC deviation for a datetime timestamp for which no QC deviation information has been received from a DBMS node. In an embodiment, the latest two data points are used to determine the linear equation that would satisfy the known logical timestamp data points for a DBMS node. Based on the linear equation, a data point is calculated for which no actual logical timestamp information has been received from the DBMS node recently.

Figure 3:
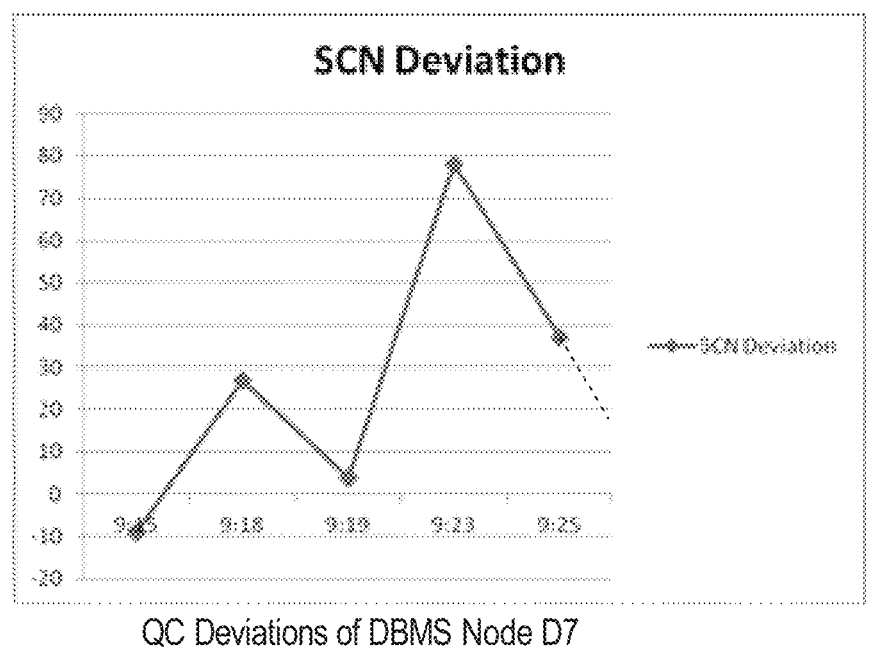
FIG. 3 is a graph diagram that depicts an example plot of QC deviations of a DBMS node as a function of the datetime timestamps at which the logical timestamps for the QC deviations have been received, in an embodiment.

FIG. 3 is an example graph diagram that depicts a plot of QC deviations of DBMS node D7 from Table 1 as a function of the datetime timestamps at which the logical timestamps for the QC deviations have been received. Based on the last two data points (9:23, 78) and (9:25, 37), the QC node may compute what the QC deviation would be if the plot was extended to 9:26, as depicted by a dotted line in FIG. 3.

In another embodiment, a machine learning algorithm may be used to train a machine learning model for a DBMS node using the data points in the history log for the DBMS node. The model is trained by known QC deviation data for the DBMS node for different DBMS nodes. Examples of machine algorithms include other types of regression algorithms, decision tree, random forest and neural networks. The trained machine learning model is executed using the current datetime timestamp or a future datetime timestamp to accurately estimate the QC deviation for the DBMS node as of that datetime timestamp.

Synchronization Log

In an embodiment, when a QC node determines the QC deviation for a DBMS node, the QC node adjusts the QC deviation by a delta value to safeguard against the synchronization miss for the DBMS node. The delta value may further include estimate of time taken for query to reach the node (e.g. a communication delay). Such estimates of remote call latencies may also be stored at the QC node. For example, in the above equation, y=f(x)+delta, the delta may represent such a delta value to safeguard against synchronization miss.

In one embodiment, the QC node may store historical values for timestamp misses for one or more DBMS nodes. When a QC node receives a logical timestamp of a DBMS node, the QC node may compare the received logical timestamp of the DBMS node with its estimated logical timestamp for the DBMS node based on the history log. The difference between the actual logical timestamp and the estimated timestamp may be separately recorded as a synchronization timestamp difference for the DBMS node. For example, a negative value of synchronization timestamp difference indicates that the actual logical timestamp is less than the estimated logical timestamp, and a positive value of synchronization timestamp difference indicates that the actual logical timestamp is greater than the estimated logical timestamp.

In an embodiment, the QC deviation for a DBMS node is based on an aggregated value of the synchronization timestamp differences of the DBMS node. The synchronization timestamp differences may be stored in a log using techniques similar for storing the history log. The synchronization timestamp differences may be aggregated using any statistical aggregation function such as average, median, or a maximum.

Table 2 below depicts a sample of synchronization timestamp differences for DBMS nodes $D_{1-10}$ discussed above:

TABLE 2

Synchronization log

| Node | Synchronization timestamp difference Tuples | |
|---|---|---|
| $D_1$ | (9:16 am, 0) | (9:24 am, 3) |
| $D_2$ | (9:07 am, 2) | (9:12 am, 0) |
| D3 | (9:20 am, 0) | (9:26 am, 14) |
| D4 | (9:21 am, 1) | (9:27 am, 19) |
| D5 | (9:15 am, 6) | (9:18 am, 12) |
| D6 | (9:15 am, −17) | — |
| D7 | (9:15 am, −19) | (9:18 am, 5) |
| D8 | (9:15 am, 32) | (9:18 am, 15) |
| D9 | — | (9:18 am, 23) |
| D10 | (9:15 am, 9) | (9:18 am, 6) |

Based on the Table 2, the QC node may calculate the average synchronization timestamp difference for each of DBMS nodes D1-10. The average synchronization timestamp difference of a DBMS node may be added to the respective median QC deviation for the DBMS node. For example the list below recites the median QC deviations of DBMS nodes D1-10, calculated in the example above, adjusted by the average miss calculated from Table 2 above:

[D1]=[6+2=8],
[D2]=[15+1=16],
[D3]=[14+7=21],
[D4]=[10+10=20],
[D5]=[15+9=24],
[D6]=[7−8=−1],
[D7]=[28−7=21],
[D8]=[25+23=48],
[D9]=[12+12=14],
[D10]=[29+8=37].

Using the maximum of the revised QC deviations and the current QC node timestamp of 100, the synchronization timestamp is calculated to be 100+48=148.

In an embodiment, the synchronization miss adjustment for a DBMS node is estimated based on the previous synchronization miss(es) of the DBMS node. Linear fitting (of the last two synchronization misses), linear or other regression techniques, training machine learning models may be used on the synchronization misses recorded in the synchronization log for a DBMS node to yield an estimated synchronization miss adjustment as of a desired datetime timestamp. Such a determination of an estimated synchronization miss may improve the probability of success of the synchronization with DBMS nodes and avoid spending computing and network resources on retries.

For example, the QC node's synchronization has missed $D_5$ twice: once at 9:15 by SCN 6 and another time at 9:18 by 12. Using linear fitting between these two synchronization-miss data points, the QC node may determine that at the current time, 9:30, the synchronization miss (delta) is estimated to be 36. Adding the estimated synchronization miss to the QC deviation for D5 and QC node's current SCN, yields a new maximum of 100+15+36=151, wherein the SCN 15 represents the estimated QC deviation for D5. Using the new adjusted maximum, the QC node has a higher probability of a successful synchronization among the $D_0$-$D_{10}$ nodes.

In one embodiment, the QC node determines that one or more target DBMS nodes have frequent synchronization misses. Based on such a determination, the QC node may request the current logical timestamps for those target DBMS nodes before performing the synchronization. The determination may be made based on the number of synchronization misses for a DBMS node and/or the number of synchronization misses for a DBMS node for a specified time period.

Setting Synchronization Timestamp for Target DBMS Nodes

Continuing with FIG. 2, after estimating the synchronization timestamp at step 220, the QC node requests the target DBMS node(s) of the distributed query to use the synchronization timestamp to run the query at step 230. The target DBMS node(s) receive the requested synchronization logical timestamp and based on their respective current logical timestamps at the time of receiving message from QC, may generate the result or reject the request.

Figure 4:
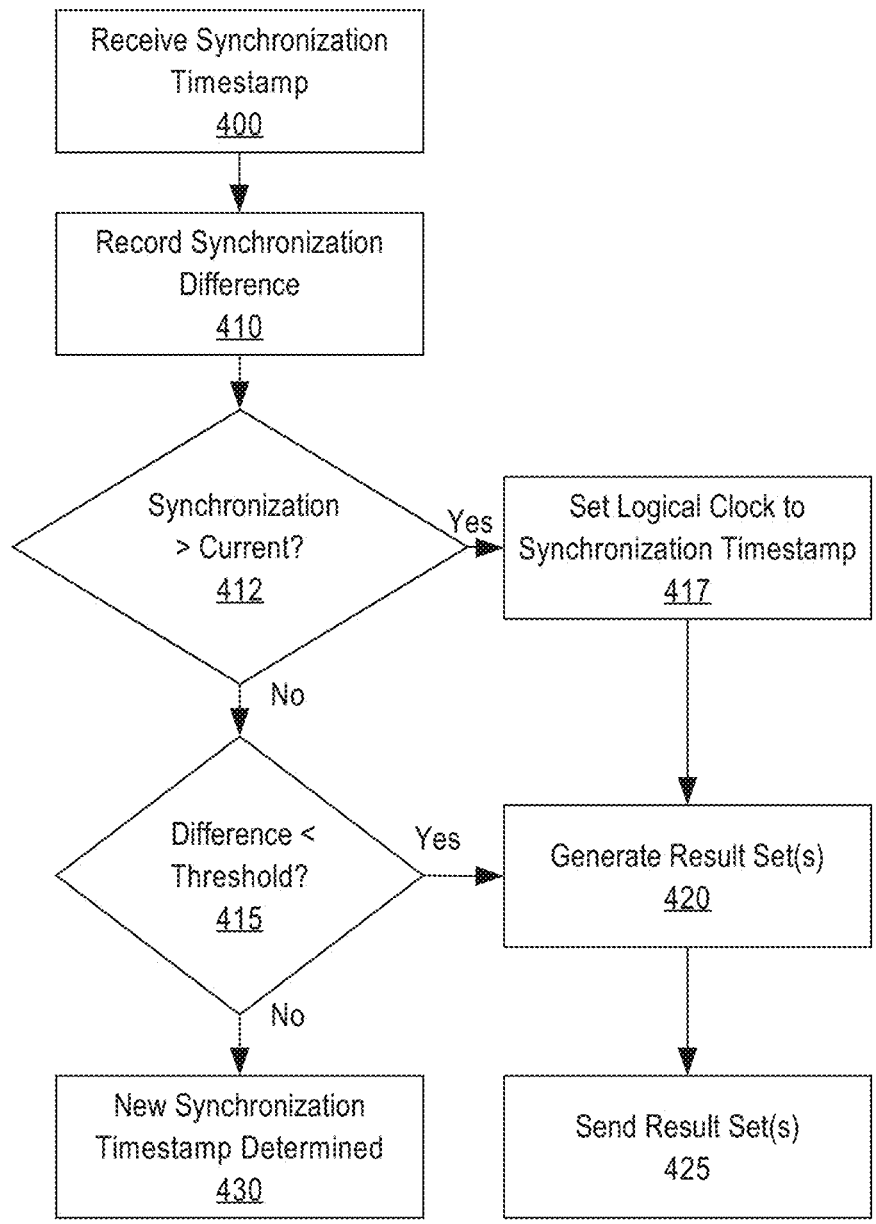
FIG. 4 is a flow diagram that depicts a process to determine whether to set a received synchronization timestamp at a target DBMS, in an embodiment.

FIG. 4 is a flow diagram that depicts a process to determine whether to set a received synchronization timestamp at a target DBMS, in an embodiment. At step 400, the target DBMS node receives the synchronization timestamp to set from the QC node for execution of the received one or more operations of the distributed query. At step 410, the target DBMS node determines the difference between the requested synchronization timestamp and the current logical timestamp of the target DBMS node's logical clock. In a related embodiment, the difference may be piggybacked to the response from the target DBMS for the QC node to store and maintain the difference in the synchronization log using techniques described above.

At step 412, if the synchronization timestamps are greater than the current logical timestamp, then the target DBMS sets its logical clock to the requested synchronization timestamp to execute the one or more requested operations of the distributed query at step 417. At step 420, the target DBMS may execute the one or more operations to generate result set(s) for the distributed query and send the result set(s) to the QC node at step 425.

In an embodiment, although the synchronization timestamp is evaluated to be less than or equal to the current logical timestamp of the logical clock at step 412, the target DBMS may still perform the operation(s) of the distributed query. If, at step 415, the difference between the synchronization timestamp and the current logical timestamp of the target DBMS is below a pre-configured threshold then the target DBMS may proceed to step 420 to execute the operations and generate result set(s) for the distributed query. Such a preconfigured synchronization miss-threshold represents the maximum synchronization miss tolerated by a target DBMS. With the synchronization miss-threshold, a target DBMS may not reject a synchronization miss. This improves the execution of a distributed query, as in such cases, rather than triggering an expensive re-synch of the synchronization timestamp using techniques described above, the QC node continues the execution of the distributed query and the receipt of result set(s) from other target DBMS nodes.

However, in an embodiment, in which the difference of the synchronization timestamp for a target DBMS node exceeds the synchronization threshold of the target DBMS node, or no such threshold is configured, a new synchronization timestamp is determined by the QC node based on the target DBMS node's logical timestamp, at step 430, as described in steps 237-239 of FIG. 2.

A rejection by a target DBMS node returns its current logical timestamps, in an embodiment. Continuing with FIG. 2, at step 235, the QC node receives current logical timestamps of all the target DBMS node(s) that have rejected the synchronized logical timestamp, as part of the rejection the respective rejected DBMS node(s). The QC node may record the logical timestamp received from the rejected target DBMS node in the history log and the synchronization timestamp difference in the synchronization log. The recorded values may be used in the next calculation of the synchronization timestamp to cause successful synchronization of the logical timestamp of the target DBMS node.

At step 237, the QC node may calculate a new synchronization timestamp using the logical timestamps received from the rejected DBMS node(s). For example, the QC node may calculate the maximum of the received current logical timestamps of target DBMS node(s) to determine the new synchronization timestamp.

At step 239, the QC node requests target DBMS node(s) to re-execute the distributed query using the new synchronization timestamp. In an embodiment, the QC node requests all target DBMS nodes to force the execution of the query using the new synchronization timestamp. In one embodiment, a target DBMS node may determine not to re-execute the query because the target DBMS node may determine that no changes has been made since the last request for the execution. For example, if the table reference by the received query has not been modified, then the target DBMS node may not re-execute the query.

Even if, at the receipt of the new synchronization timestamp, the rejected or other DBMS nodes' logical timestamps are greater than the new synchronization timestamp, the new synchronization timestamp would still be greater than the logical timestamps of all nodes when the QC node received the distributed query from the client application. This will guarantee the transactional consistency and global consistency with recency for the result set.

Accordingly, at step 240, the QC node receive the result set(s) from target DBMS node(s) and at step 242, generates a final result for the distributed query for the client based on the received result sets.

Thus, these techniques improve the execution of the distributed query because the synchronization phase is fully or at least partially avoided and round-trips to target DBMS nodes whose logical clock were less than synchronization timestamp are skipped.

Database Management Systems

A database management system (DBMS), such as any of DBMS 102A-C of FIG. 1 described herein, manages a database. A DBMS may comprise one or more database servers. A database comprises database data and a database dictionary that is stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the approach are described herein using the term "SQL", the approach is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected server nodes that share access to the same database. Typically, the server nodes are interconnected via a network and share access, in varying degrees, to shared storage, e.g. shared access to a set of disk drives and data blocks stored thereon. The server nodes in a multi-node database system may be in the form of a group of computers (e.g. work stations, personal computers) that are interconnected via a network. Alternately, the server nodes may be the server nodes of a grid, which is composed of server nodes in the form of server blades interconnected with other server blades on a rack.

Each server node in a multi-node database system hosts a database server. A server, such as a database server, is a combination of integrated software components and an allocation of computational resources, such as memory, a server node, and processes on the server node for executing the integrated software components on a processor, the combination of the software and computational resources being dedicated to performing a particular function on behalf of one or more clients.

Resources from multiple server nodes in a multi-node database system can be allocated to running a particular database server's software. Each combination of the software and allocation of resources from a server node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
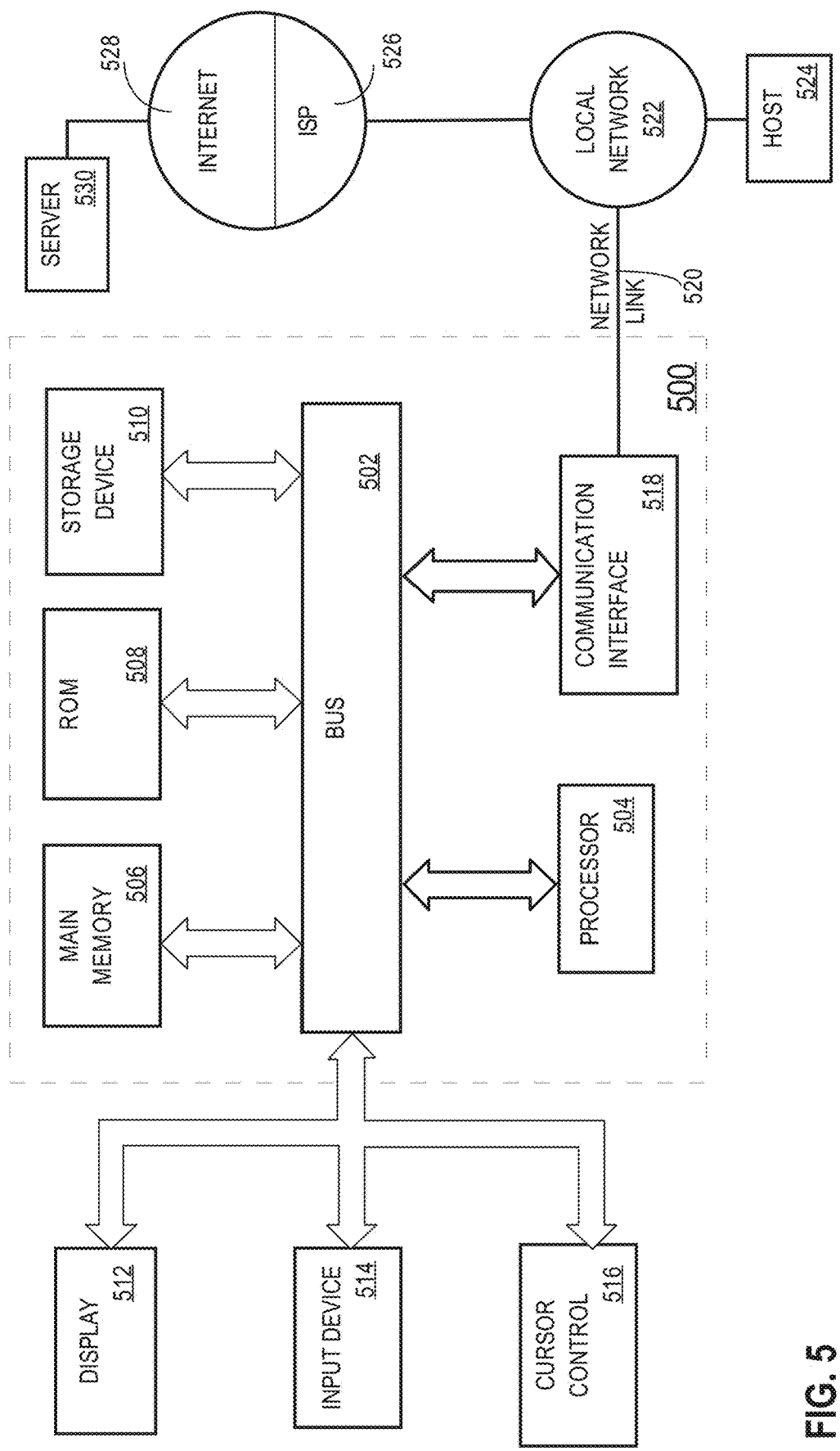
FIG. 5 is a block diagram that illustrates a computer system upon which an embodiment of the approach may be implemented.

For example, FIG. 5 is a block diagram that illustrates a computer system 500 upon which an embodiment of the approach may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Cloud Computing Overview

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method, performed by a coordinator database management system (DBMS) of a plurality of DBMS's, each DBMS of the plurality of DBMS's comprising one or more database servers performing operations on one or more databases of said each DBMS, comprising:
   receiving, at the coordinator DBMS, a query to be at least partially executed on at least one target DBMS of the plurality of DBMS's;
   storing, at the coordinator DBMS, one or more previous logical timestamps of the at least one target DBMS that were received prior to the receiving the query;
   without requesting from the at least one target DBMS a current logical timestamp of the at least one target DBMS, calculating a synchronization timestamp for the query;
   wherein calculating the synchronization timestamp for the query is at least in part based on a current logical timestamp of the coordinator DBMS and the one or more previous logical timestamps of the at least one target DBMS that were stored prior to the receiving the query;
   wherein the calculated synchronization timestamp is different than the current logical timestamp of the coordinator DBMS and is different than the one or more previous logical timestamps of the at least one target DBMS;
   sending a request to the at least one target DBMS to perform one or more operations as of an execution logical timestamp of a logical clock of the at least one target DBMS, the execution logical timestamp being based on the calculated synchronization timestamp of the request; and
   receiving a result for performing the one or more operations of the query by the at least one target DBMS at the execution logical timestamp that is based on the calculated synchronization timestamp of the request.

2. The method of claim 1, wherein the one or more operations are first one or more operations and the method further comprising:
   prior to the receiving, at the coordinator DBMS, the query:
      sending, from the coordinator DBMS, to the at least one target DBMS, a request for one or more second operations to be performed on the at least one target DBMS;
      in response to sending the request for one or more second operations to the at least one target DBMS, receiving, from the at least one target DBMS, a particular logical timestamp of the at least one target DBMS,
      wherein the particular logical timestamp of the at least one target DBMS is one of the one or more previous logical timestamps of the at least one target DBMS.

3. The method of claim 1, wherein the one or more operations are first one or more operations and the method further comprising:

prior to the receiving, at the coordinator DBMS, the query:
  receiving, at the coordinator DBMS, from the at least one target DBMS, a request for one or more second operations to be performed on the coordinator DBMS;
  receiving, within the request for the one or more second operations, a particular logical timestamp of the at least one target DBMS,
  wherein the particular logical timestamp of the at least one target DBMS is one of the one or more previous logical timestamps of the at least one target DBMS.

4. The method of claim 1, wherein the current logical timestamp of the at least one target DBMS is a first current logical timestamp of the at least one target DBMS and the method further comprising:
prior to the receiving, at the coordinator DBMS, the query:
  periodically sending, from the coordinator DBMS, to the at least one target DBMS, a request for a second current logical timestamp of the at least one target DBMS;
  in response to sending the request for the second current logical timestamp of the at least one target DBMS to the at least one target DBMS, receiving, from the at least one target DBMS, a particular logical timestamp of the at least one target DBMS,
  wherein the particular logical timestamp of the at least one target DBMS is one of the one or more previous logical timestamps of the at least one target DBMS.

5. The method of claim 1, further comprising:
prior to the receiving, at the coordinator DBMS, the query:
  receiving, at the coordinator DBMS, at least one previous logical timestamp of the one or more previous logical timestamps of the at least one target DBMS;
  calculating a logical timestamp difference of the at least one previous logical timestamp of the one or more previous logical timestamps and a particular logical timestamp of the coordinator DBMS at a time of the receiving the at least one previous logical timestamp; and
  storing the logical timestamp difference in a log of the coordinator DBMS.

6. The method of claim 1, wherein calculating the synchronization timestamp for the query, further comprises:
  calculating, using an aggregating function, a particular difference of logical timestamps of the at least one target DBMS by aggregating differences of the one or more previous logical timestamps of the at least one target DBMS and one or more respective logical timestamps of the coordinator DBMS at respective receipts of the one or more previous logical timestamps;
  based on the current logical timestamp of the coordinator DBMS and the particular difference of logical timestamps, determining the synchronization timestamp for the query.

7. The method of claim 1, wherein calculating the synchronization timestamp for the query, further comprises:
  estimating a particular difference of logical timestamps of the at least one target DBMS based on datetime timestamps of respective receipts of the one or more previous logical timestamps and differences of the one or more previous logical timestamps of the at least one target DBMS and one or more respective logical timestamps of the coordinator DBMS at the time of the receiving the one or more previous logical timestamps;
  based on the current logical timestamp of the coordinator DBMS and the particular difference of logical timestamps, determining the synchronization timestamp for the query.

8. The method of claim 1, wherein calculating the synchronization timestamp for the query, further comprises:
  using a machine learning algorithm, training a machine learning model based on datetime timestamps of respective receipts of the one or more previous logical timestamps and differences of the one or more previous logical timestamps of the at least one target DBMS and one or more respective logical timestamps of the coordinator DBMS at the time of the receiving the one or more previous logical timestamps;
  based on the machine learning model and a current datetime timestamp at the coordinator DBMS, determining the synchronization timestamp for the query.

9. The method of claim 1, wherein the one or more previous logical timestamps of the at least one target DBMS exclude one or more outdated logical timestamps of the at least one target DBMS that have been received prior to a time period configured for the at least one target DBMS.

10. The method of claim 1, wherein the query is to be at least partially executed on another target DBMS of the plurality of DBMS's, and the method further comprising:
  prior to calculating the synchronization timestamp:
    determining that a current logical timestamp for the other target DBMS has to be obtained from the other target DBMS;
    sending a request for the current logical timestamp of the other target DBMS;
    in response to receiving the current logical timestamp of the other target DBMS, calculating the synchronization timestamp based at least in part on the current logical timestamp of the other target DBMS.

11. The method of claim 1, wherein the query is to be at least partially executed on another DBMS of the plurality of DBMS's, and the method further comprising:
  using one or more aggregation functions, calculating a particular aggregate value of:
    differences of the one or more previous logical timestamps of the at least one target DBMS and one or more respective logical timestamps of the coordinator DBMS at the time of the receiving the one or more previous logical timestamps, and
    differences of one or more other previous logical timestamps of the other target DBMS and the one or more respective logical timestamps of the coordinator DBMS at the time of receiving the one or more other previous logical timestamps; and
  based on the particular aggregate value and the current logical timestamp of the coordinator DBMS, calculating the synchronization timestamp.

12. One or more non-transitory computer-readable media storing a set of instructions, wherein the set of instructions include instructions, which when executed by one or more hardware processors, cause:
  at a coordinator database management system (DBMS) of a plurality of DBMS's, each DBMS of the plurality of DBMS's comprising one or more database servers performing operations on one or more databases of said each DBMS, receiving a query is to be at least partially executed on at least one target DBMS of the plurality of DBMS's;
  storing, at the coordinator DBMS, one or more previous logical timestamps of the at least one target DBMS that were received prior to the receiving the query;

without requesting from the at least one target DBMS a current logical timestamp of the at least one target DBMS, calculating a synchronization timestamp for the query;

wherein calculating the synchronization timestamp for the query is at least in part based on a current logical timestamp of the coordinator DBMS and the one or more previous logical timestamps of the at least one target DBMS that were stored prior to the receiving the query;

wherein the calculated synchronization timestamp is different than the current logical timestamp of the coordinator DBMS and is different than the one or more previous logical timestamps of the at least one target DBMS;

sending a request to the at least one target DBMS to perform one or more operations as of an execution logical timestamp of a logical clock of the at least one target DBMS, the execution logical timestamp being based on the calculated synchronization timestamp of the request; and receiving a result for performing the one or more operations of the query by the at least one target DBMS at the execution logical timestamp that is based on the calculated synchronization timestamp of the request.

13. The one or more non-transitory computer-readable media of claim 12, wherein the one or more operations are first one or more operations, and wherein the set of instructions further include instructions, which when executed by said one or more hardware processors, cause:

prior to the receiving, at the coordinator DBMS, the query:

sending, from the coordinator DBMS, to the at least one target DBMS, a request for one or more second operations to be performed on the at least one target DBMS;

in response to sending the request to the at least one target DBMS, receiving, from the at least one target DBMS, a particular logical timestamp of the at least one target DBMS, wherein the particular logical timestamp of the at least one target DBMS is one of the one or more previous logical timestamps of the at least one target DBMS.

14. The one or more non-transitory computer-readable media of claim 12, wherein the one or more operations are first one or more operations, and wherein the set of instructions further include instructions, which when executed by said one or more hardware processors, cause:

prior to the receiving, at the coordinator DBMS, the query:

receiving, at the coordinator DBMS, from the at least one target DBMS, a request for one or more second operations to be performed on the coordinator DBMS;

receiving, within the request for the one or more second operations, a particular logical timestamp of the at least one target DBMS, wherein the particular logical timestamp of the at least one target DBMS is one of the one or more previous logical timestamps of the at least one target DBMS.

15. The one or more non-transitory computer-readable media of claim 12, wherein the current logical timestamp of the at least one target DBMS is a first current logical timestamp of the at least one target DBMS, and wherein the set of instructions further include instructions, which when executed by said one or more hardware processors, cause:

prior to the receiving, at the coordinator DBMS, the query:

periodically sending, from the coordinator DBMS, to the at least one target DBMS, a request for a second current logical timestamp of the at least one target DBMS;

in response to sending the request for the second current logical timestamp of the at least one target DBMS to the at least one target DBMS, receiving, from the at least one target DBMS, a particular logical timestamp of the at least one target DBMS, wherein the particular logical timestamp of the at least one target DBMS is one of the one or more previous logical timestamps of the at least one target DBMS.

16. The one or more non-transitory computer-readable media of claim 12, wherein the set of instructions further include instructions, which when executed by said one or more hardware processors, cause:

prior to the receiving, at the coordinator DBMS, the query:

receiving, at the coordinator DBMS, at least one previous logical timestamp of the one or more previous logical timestamps of the at least one target DBMS;

calculating a logical timestamp difference of the at least one previous logical timestamp of the one or more previous logical timestamps and a particular logical timestamp of the coordinator DBMS at a time of the receiving the at least one previous logical timestamp; and storing the logical timestamp difference in a log of the coordinator DBMS.

17. The one or more non-transitory computer-readable media of claim 12, wherein the set of instructions further include instructions, which when executed by said one or more hardware processors, cause:

calculating, using an aggregating function, a particular difference of logical timestamps of the at least one target DBMS by aggregating differences of the one or more previous logical timestamps of the at least one target DBMS and one or more respective logical timestamps of the coordinator DBMS at respective receipts of the one or more previous logical timestamps;

based on the current logical timestamp of the coordinator DBMS and the particular difference of logical timestamps, determining the synchronization timestamp for the query.

18. The one or more non-transitory computer-readable media of claim 12, wherein the set of instructions further include instructions, which when executed by said one or more hardware processors, cause:

estimating a particular difference of logical timestamps of the at least one target DBMS based on datetime timestamps of respective receipts of the one or more previous logical timestamps and differences of the one or more previous logical timestamps of the at least one target DBMS and one or more respective logical timestamps of the coordinator DBMS at the time of the receiving the one or more previous logical timestamps;

based on the current logical timestamp of the coordinator DBMS and the particular difference of logical timestamps, determining the synchronization timestamp for the query.

19. The one or more non-transitory computer-readable media of claim 12, wherein the set of instructions further include instructions, which when executed by said one or more hardware processors, cause:

using a machine learning algorithm, training a machine learning model based on datetime timestamps of respective receipts of the one or more previous logical timestamps and differences of the one or more previous logical timestamps of the at least one target DBMS and one or more respective logical timestamps of the coordinator DBMS at the time of the receiving the one or more previous logical timestamps;

based on the machine learning model and a current datetime timestamp at the coordinator DBMS, determining the synchronization timestamp for the query.

20. The one or more non-transitory computer-readable media of claim 12, wherein the one or more previous logical timestamps of the at least one target DBMS exclude one or more outdated logical timestamps of the at least one target DBMS that have been received prior to a time period configured for the at least one target DBMS.

21. The one or more non-transitory computer-readable media of claim 12, wherein the query is to be at least partially executed on another target DBMS of the plurality of DBMS's and wherein the set of instructions further include instructions, which when executed by said one or more hardware processors, cause:

prior to calculating the synchronization timestamp:
determining that a current logical timestamp for the other target DBMS has to be obtained from the other target DBMS;
sending a request for the current logical timestamp of the other target DBMS;
in response to receiving the current logical timestamp of the other target DBMS, calculating the synchronization timestamp based at least in part on the current logical timestamp of the other target DBMS.

22. The one or more non-transitory computer-readable media of claim 12, wherein the query is to be at least partially executed on another DBMS of the plurality of DBMS's, and wherein the set of instructions further include instructions, which when executed by said one or more hardware processors, cause:

using one or more aggregation functions, calculating a particular aggregate value of:
differences of the one or more previous logical timestamps of the at least one target DBMS and one or more respective logical timestamps of the coordinator DBMS at the time of the receiving the one or more previous logical timestamps, and
differences of one or more other previous logical timestamps of the other target DBMS and one or more respective logical timestamps of the coordinator DBMS at the time of receiving the one or more other previous logical timestamps; and
based on the particular aggregate value and the current logical timestamp of the coordinator DBMS, calculating the synchronization timestamp.

23. The method of claim 1, wherein calculating the synchronization timestamp for the query, further comprises:
selecting a plurality of logical timestamp differences, wherein each logical timestamp difference is a difference between each previous logical timestamp of each target DBMS, of the plurality of DBMS's, on which the query is to be at least partially executed, and a respective logical timestamp of the coordinator DBMS at a respective receipt of said each previous logical timestamp of said each target DBMS of the plurality of DBMS's at the coordinator DBMS;
calculating an aggregate logical timestamp difference by aggregating at least in part the plurality of logical timestamp differences using an aggregating function;
based on a sum of the aggregate logical timestamp difference and the current logical timestamp of the coordinator DBMS, determining the synchronization timestamp for the query.

24. The method of claim 1, wherein calculating the synchronization timestamp for the query, further comprises:
estimating a plurality of estimated logical timestamps, wherein each estimated logical timestamp corresponds to each target DBMS, of the plurality of DBMS's, on which the query is to be at least partially executed;
wherein estimating said each estimated logical timestamp of said each target DBMS comprises extrapolating said each estimated logical timestamp based on a plurality of previous logical timestamps of said each target DBMS and a plurality of respective logical timestamps of the coordinator DBMS at the time of the receiving each of the plurality of previous logical timestamps;
based on the plurality of estimated logical timestamps, determining the synchronization timestamp for the query.

25. The one or more non-transitory computer-readable media of claim 12, wherein the set of instructions further include instructions, which when executed by said one or more hardware processors, cause:
selecting a plurality of logical timestamp differences, wherein each logical timestamp difference is a difference between each previous logical timestamp of each target DBMS, of the plurality of DBMS's, on which the query is to be at least partially executed, and a respective logical timestamp of the coordinator DBMS at a respective receipt of said each previous logical timestamp of said each target DBMS of the plurality of DBMS's at the coordinator DBMS;
calculating an aggregate logical timestamp difference by aggregating at least in part the plurality of logical timestamp differences using an aggregating function;
based on a sum of the aggregate logical timestamp difference and the current logical timestamp of the coordinator DBMS, determining the synchronization timestamp for the query.

26. The one or more non-transitory computer-readable media of claim 12, wherein the set of instructions further include instructions, which when executed by said one or more hardware processors, cause:
estimating a plurality of estimated logical timestamps, wherein each estimated logical timestamp corresponds to each target DBMS, of the plurality of DBMS's, on which the query is to be at least partially executed;
wherein estimating said each estimated logical timestamp of said each target DBMS comprises extrapolating said each estimated logical timestamp based on a plurality of previous logical timestamps of said each target DBMS and a plurality of respective logical timestamps of the coordinator DBMS at the time of the receiving each of the plurality of previous logical timestamps;
based on the plurality of estimated logical timestamps, determining the synchronization timestamp for the query.

* * * * *

UNITED STATES PATENT AND TRADEMARK OFFICE
CERTIFICATE OF CORRECTION

| | |
|---|---|
| PATENT NO. | : 11,314,720 B2 |
| APPLICATION NO. | : 15/908782 |
| DATED | : April 26, 2022 |
| INVENTOR(S) | : Bastawala et al. |

It is certified that error appears in the above-identified patent and that said Letters Patent is hereby corrected as shown below:

In the Specification

In Column 3, Lines 56-57, delete "SYNCHRONIZING LOGICAL TIME FOR A DISTRIBUTED QUERY" and insert the same on Line 57, as a new paragraph heading, therefor.

Signed and Sealed this
Sixteenth Day of August, 2022

Katherine Kelly Vidal
*Director of the United States Patent and Trademark Office*